US012643688B2

(12) United States Patent

Squyres et al.

(10) Patent No.: US 12,643,688 B2

(45) Date of Patent: Jun. 2, 2026

(54) ROCKET ENGINE-BASED PAYLOAD TRANSPORTER

(71) Applicant: Blue Origin Manufacturing, LLC, Huntsville, AL (US)

(72) Inventors: Steven W. Squyres, Black Diamond, WA (US); Stephen Johnson, Kent, WA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 0 days.

(21) Appl. No.: 18/956,770

(22) Filed: Nov. 22, 2024

(65) Prior Publication Data

US 2026/0145817 A1 May 28, 2026

(51) Int. Cl.
B64G 1/40 (2006.01)
B64G 1/64 (2006.01)

(52) U.S. Cl.
CPC ............. B64G 1/641 (2013.01); B64G 1/401 (2013.01)

(58) Field of Classification Search
CPC ........ B64G 1/641; B64G 1/401; B64G 1/625; B64G 1/643; B64G 1/1071; B64G 1/105; B64G 1/1064; B64U 2101/64
See application file for complete search history.

(56) References Cited

U.S. PATENT DOCUMENTS

| | | | | |
|---|---|---|---|---|
| 6,276,639 B1 * | 8/2001 | Hornung | ................ | B64G 1/642 |
| | | | | 244/173.3 |
| 8,991,764 B2 * | 3/2015 | Auger | ................... | B64G 1/625 |
| | | | | 244/158.9 |
| 11,130,570 B2 * | 9/2021 | Green | .................... | B64U 10/13 |
| 2008/0023587 A1 * | 1/2008 | Head | ....................... | G01C 21/24 |
| | | | | 244/171.1 |
| 2011/0084162 A1 * | 4/2011 | Goossen | ................ | B64U 70/80 |
| | | | | 244/135 C |
| 2022/0112932 A1 * | 4/2022 | Agostini | ............... | G01L 5/0052 |
| 2023/0251661 A1 * | 8/2023 | Matthews | ............ | G05D 1/0027 |
| | | | | 701/1 |
| 2024/0351710 A1 * | 10/2024 | Fu | ............................ | B64G 1/16 |

OTHER PUBLICATIONS

Donahue, Ben, et al, Lunar Lander Concept Design for the 2019 NASA Outpost Mission, 2007, AIAA Space 2007 Conference & Exposition. (Year: 2007).*

* cited by examiner

*Primary Examiner* — Medhat Badawi
*Assistant Examiner* — Vicente Rodriguez
(74) *Attorney, Agent, or Firm* — Summit Patents, PC

(57) ABSTRACT

A propulsion-based payload transporter (PPT) and methods of its operation are provided. The PPT may operate in a gravitational field such as that on the lunar surface. Via rocket engines that produce thrust, the PPT is configured to descend onto and over a payload to be moved. Once in position with respect to the payload, latches engage with the payload so as to secure the payload in a payload holding bay of the PPT. The rocket engines produce thrust with an exhaust plume that is angled away from the payload to avoid payload damage. The rocket engines, which are located at the sides of the payload holding bay, produce thrust to propel the PPT and the payload in a substantially horizontal trajectory with respect to gravity and toward a landing destination.

20 Claims, 4 Drawing Sheets

Phase I   Phase II   Phase III   Phase IV   Phase V

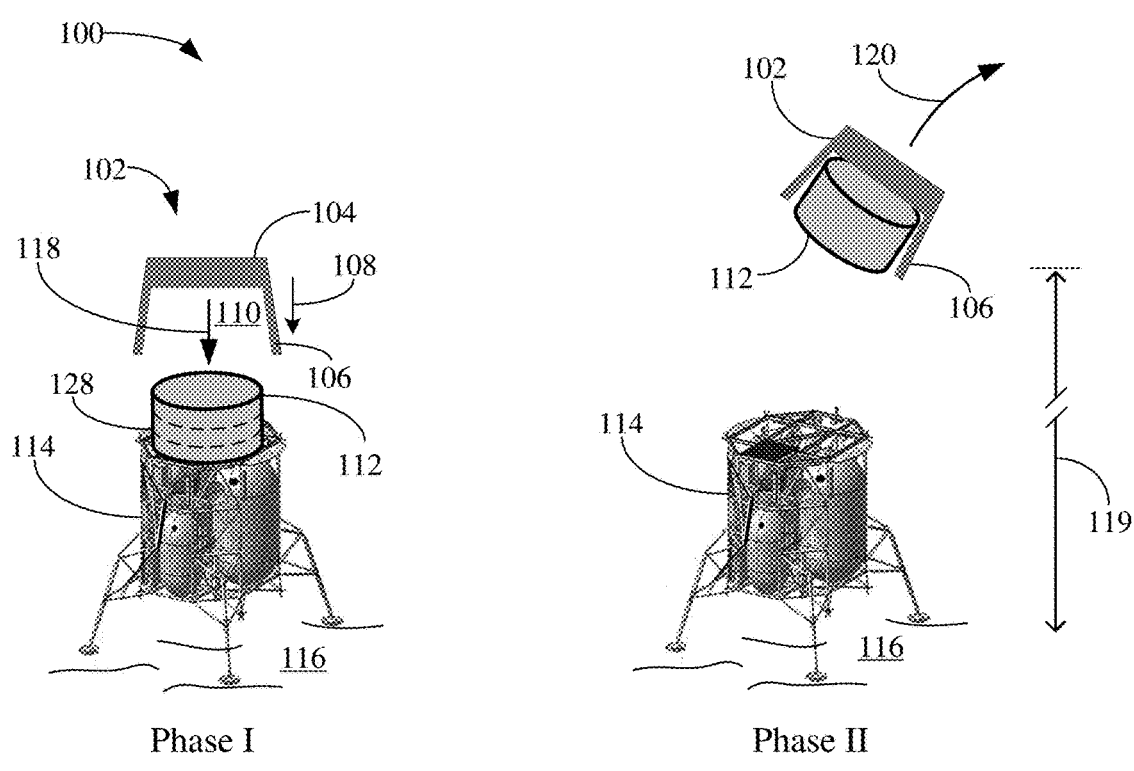
Phase I                    Phase II
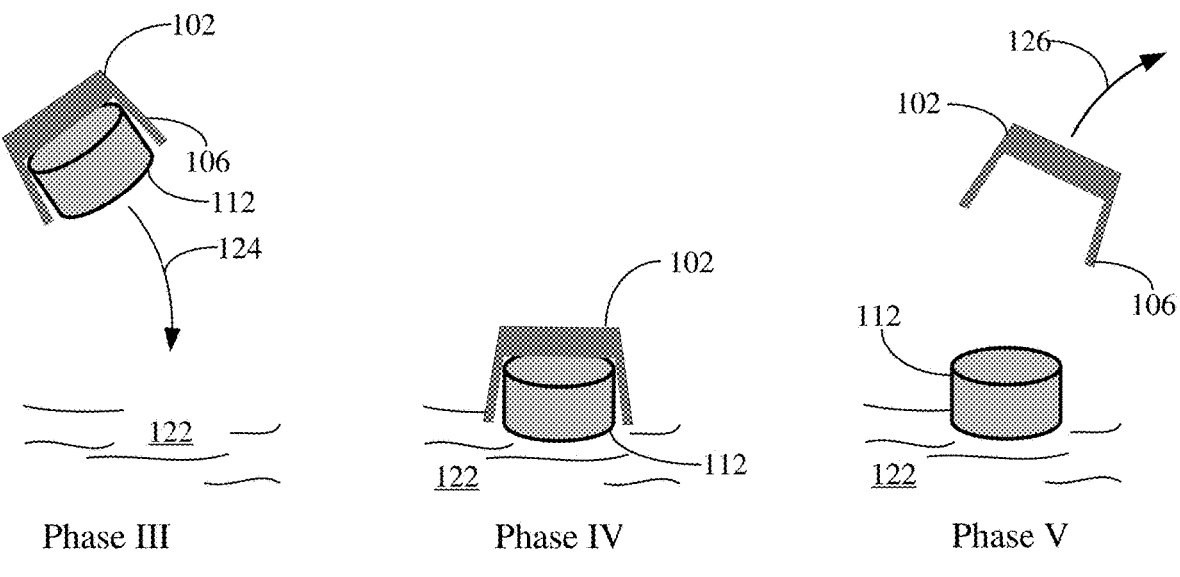
Phase III         Phase IV         Phase V
FIG. 1

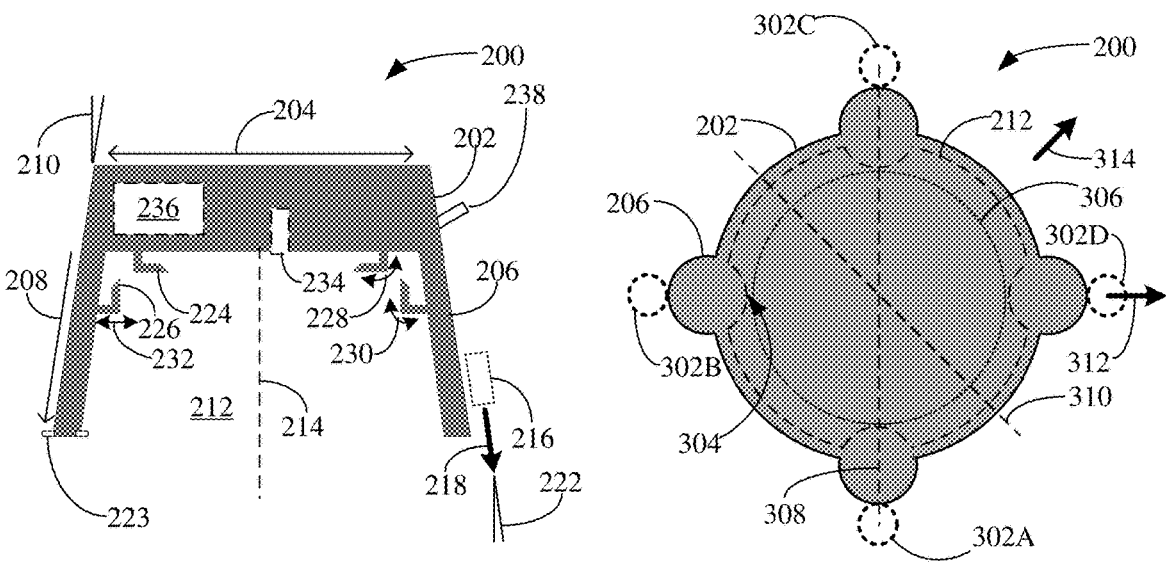
FIG. 2          FIG. 3
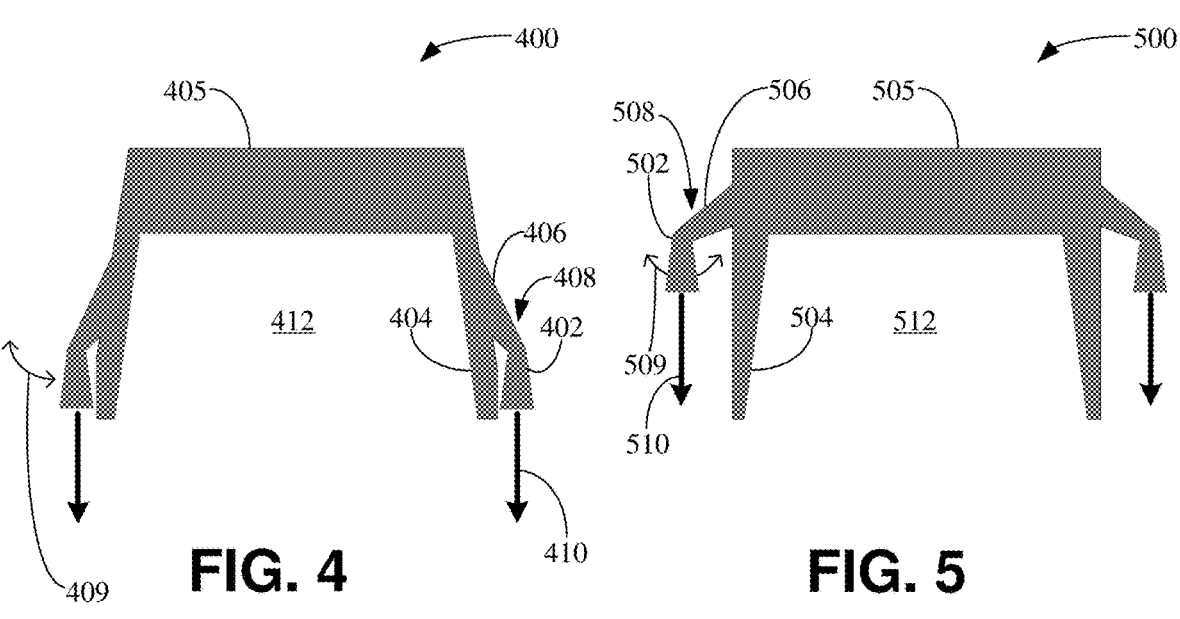
FIG. 4          FIG. 5

600

700

ROCKET ENGINE-BASED PAYLOAD TRANSPORTER

BACKGROUND

As plans for increasing activities on the Moon arise, so does the need for developing techniques for moving cargo or payloads from one location to another on the Moon's surface. The Moon's relatively weak gravity may at first appear to allow for easy solutions to the general problem of transporting large objects. However, the harsh environment of the Moon, such as extreme temperature ranges, vacuum, and solar and cosmic rays, just to name a few examples, presents challenges for designing a payload transport system or technique. Additionally, and perhaps most significantly, the surface of the Moon includes many features, such as steep slopes, craters, rocks, boulders, and extremely dusty terrain. Such features set forth a number of difficulties that would be associated with cargo or payload transport.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 1 is a schematic representation of a process of transporting a payload using a propulsion-based payload transporter, according to some embodiments.

FIG. 2 is a schematic cross-section view of a propulsion-based payload transporter, according to some embodiments.

FIG. 3 is a schematic top view of a propulsion-based payload transporter, according to some embodiments.

FIG. 4 is a schematic cross-section view of a propulsion-based payload transporter, according to other embodiments.

FIG. 5 is a schematic cross-section view of a propulsion-based payload transporter, according to still other embodiments.

DETAILED DESCRIPTION

Figure 6:
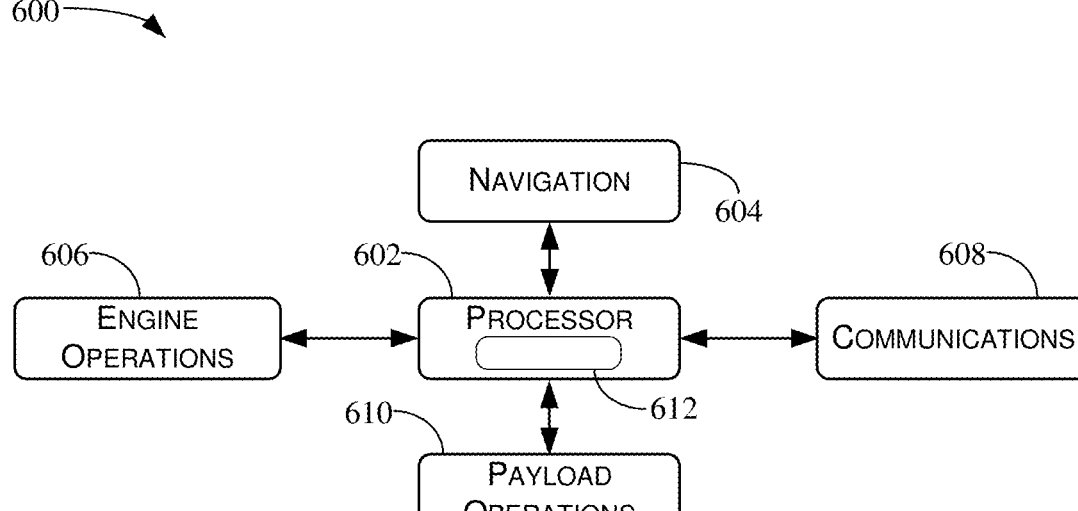
FIG. 6 is a block diagram of a control system of a propulsion-based payload transporter, according to some embodiments.

This disclosure describes a payload transporter, and methods of its operation, for moving payloads from one location to another. The payload transporter, herein called a propulsion-based payload transporter (PPT), operates using rocket engines. In some embodiments, the PPT is configured to operate in a substantial gravitational field. Such a gravitational field may be at the surface of Earth, the Moon, Mars, or an asteroid, for example. A PPT as described herein may also operate in a gravity-free environment and claimed subject matter is not limited in this respect. In some implementations, a payload to be moved may be a transport container for containing various types of contents and is configured to be compatible with the PPT, as explained below. The contents may be any number or type of items that fit in the transport container, especially if the casing of the transport container is thermally insulated and/or can block at least some solar or cosmic radiation, for instance. Accordingly, such things as food, equipment, tools, instruments, and fuel, just to name a few examples, may be placed in a transport container that can be moved by a PPT.

In some embodiments, a PPT may comprise a spacecraft body from which three or more landing legs extend downward. The spacecraft body may also include relatively small rocket engines that each produce an exhaust plume so as to provide a propulsive force to the PPT. A payload holding bay is just below the spacecraft body and within a perimeter defined by the landing legs. The payload holding bay is a volume of space where a payload to be transported by the PPT resides. Latches on various parts of the spacecraft body or on the landing legs may be used to securely fasten the payload in the payload holding bay during transport. The latches may be configured to engage or disengage with a payload that is in the payload holding bay, depending on whether the payload is being received at a pickup location or deposited at a destination, for example. In some implementations, the latches may be on a side (e.g., an underside) of the spacecraft body that faces the payload holding bay or on sides of the landing legs that face the payload holding bay. The latches may be a mechanism that, when engaged with an object (e.g., a payload or portion thereof), attaches to the object until the latch disengages with the object. In some implementations, a latch may be activated to be engaged with an object by translation and/or rotation of a portion of the latch so as to "latch onto" the object or "hook into" the object, for example. Other types of mechanisms may be used to securely hold a payload in the payload holding bay of the PPT and claimed subject matter is not limited to any particular type of holding mechanism.

As described in greater detail below, the rocket engines may be oriented so as to generally direct their exhaust plume at an angle away from the payload holding bay. Accordingly, damage to a payload in the payload holding bay from the hot gases of the exhaust plumes during pickup, transport, and drop-off may be avoided. Additionally, the rocket engines may either be angularly fixed or gimballed to achieve 6-degree of freedom control of the vehicle (e.g., translations and rotations). Instead, the rocket engines may be operated to collectively propel the PPT in any trajectory based on which of the rocket engines are selected to produce thrust.

In some embodiments, a method of operating a PPT, starting with picking up a payload to be transported to a destination, may include controllably descending onto and over the payload. For example, the PPT may descend onto and over the payload so that the payload ends up in the payload holding bay of the PPT. Latches may then be activated to engage with the payload so as to secure the payload in the payload holding bay. Once the payload is secure, the PPT may selectively activate one or more rocket engines to produce thrust so as to cause the PPT to ascend. The method may then continue with the one or more rocket engines selectively activated to produce thrust so as to cause the PPT to fly in a substantially horizontal trajectory (e.g., with respect to gravity) and toward the destination. Upon nearing the destination, the one or more rocket engines may further be selectively activated to produce thrust so as to cause the propulsion-based payload transporter with the payload to descend toward the landing destination. After the PPT has controllably descended onto the landing destination, the latches may be activated to disengage with the payload so as to release the payload from the payload holding bay. Next, the one or more rocket engines may be selectively activated to produce thrust so as to cause the propulsion-based payload transporter, which is no longer holding the payload, to ascend to another destination.

FIG. 1 is a schematic representation of five example phases of a process 100 of transporting a payload using a PPT 102, according to some embodiments. For sake of providing a particular example, process 100 occurs on the Moon, but claimed subject matter is not so limited. In other examples, a process such as 100 may occur on Earth, Mars, a large asteroid, and so on. PPT 102 comprises a spacecraft body 104 and landing legs 106 that may extend in a general downward direction 108 from the spacecraft body. Spacecraft body 104 and landing legs 106 form a partially enclosed payload holding bay 110, which is a space that is configured to receive and retain a payload 112. As mentioned above, payload 112 may be a transport container.

In example phase I, payload 112 sits unattached atop a lunar lander 114 on the Moon's surface 116. PPT 102 descends vertically (e.g., as defined by the local direction of gravity and indicated by arrow 118) onto and over payload 112, wherein landing legs 106 straddle the payload. As explained below, such a vertical descent may be performed by PPT 102 operating small rocket engines (not illustrated in FIG. 1) so that thrust produced by each of the rocket engines is substantially equal to one another.

As described below, latches engage to securely hold payload 112 to PPT 102. For example, the latches may be configured to engage with corresponding hardware on a transport container containing the payload.

In example phase II, PPT 102 may ascend, with payload 112, vertically away from lunar lander 114 by operating the small rocket engines so that thrust produced by each of the rocket engines is substantially equal to one another in a similar or same way as for the vertical descent in phase I. Upon ascending to a predetermined elevation 119 above the lunar surface, PPT 102 may selectively activate some of its rocket engines to change its trajectory 120 toward a generally horizontal direction. The PPT may perform this direction change by maintaining thrust in only one or two of the rocket engines, as explained below.

In example phase III, PPT 102 may descend, with payload 112, to a destination 122, which may be on the lunar surface or a fabricated structure, by selectively operating (including maintaining an off-state of) the small rocket engines to achieve a downward trajectory 124. In example phase IV, PPT 102 may land on a surface (e.g., regolith or a landing pad) of destination 122. The latches may disengage from payload 112 so that PPT 102 and the payload are no longer attached to each other. In example phase V, PPT 102 may ascend, without payload 112, vertically away from destination 122 by operating the small rocket engines so that thrust produced by each of the rocket engines is substantially equal to one another, in a similar or same way as for the vertical ascent from lunar lander 114 in phase II. Upon ascending to a predetermined elevation above the lunar surface, PPT 102 may selectively activate some of its rocket engines to change its trajectory 126 toward a generally horizontal direction, as in phase II. The PPT may perform this direction change by maintaining thrust in only one or two of the rocket engines. In some implementations, trajectory 126 may lead to another payload for pickup at another location. In other implementations, trajectory 126 may lead to merely a parking or resting location where PPT 102 sits inactive. In still other implementations, trajectory 126 may lead to another destination for payload drop off. For example, payload 112, referring to the figure for phase I, may comprise two or more separable payload portions 128. Each payload portion 128 may be delivered to a respective destination. As described below, PPT 102 may include sets of latches configured to separately release each of the payload portions 128 at the different destinations. For example, a payload portion at the bottom of the stack may be dropped off first at a first destination. The remaining payload portions may be sequentially dropped off from the bottom to the topmost payload portion. In some implementations, the latches may be configured to drop off two or more payload portions at a single destination.

FIG. 2 is a schematic cross-section view of a PPT 200, according to some embodiments. PPT 200 may be the same as or similar to PPT 102, for example. Various parts of PPT 200 are not necessarily drawn to scale. PPT 200 may comprise a spacecraft body 202 extending primarily in a first direction 204, and three or more landing legs 206 extending from the spacecraft body in a second direction 208 that is perpendicular to first direction 204 or offset from perpendicular to the first direction by a first acute angle 210. PPT 200 may also comprise a payload holding bay 212 partially enclosed by spacecraft body 202 and the three or more landing legs 206. For description purposes, payload holding bay 212 has a central axis 214 that is perpendicular to spacecraft body 202 and first direction 204. Rocket engines 216 may be configured to independently produce thrust via an exhaust plume 218 from a nozzle in a direction that is angled away from payload holding bay 212 by a second acute angle 222 with respect to central axis 214. Rocket engines 216 may be located on any of a number of locations on PPT 200. In some implementations, the three or more landing legs 206 may each include a landing foot 223 configured to land on a surface, such as a cargo holder, lander, or lunar or planetary surface, and at least in part support the mass of the PPT 200. In other implementations, distal portions of the three or more landing legs 206, sans landing feet, may be configured (e.g., designed to be strong enough) to directly land on such surfaces.

PPT 200 may also comprise latches 224 on spacecraft body 202 and/or latches 226 on the three or more landing legs 206. For example, latches 224 on spacecraft body 202 are on a side of the spacecraft body that faces payload holding bay 212 and latches 226 on the three or more landing legs 206 are on sides of the three or more landing legs that face the payload holding bay. Latches 224 and 226 may be configured to engage or disengage with a payload (e.g., 112) that is in payload holding bay 212. For example, latches 224 on spacecraft body 202 may be configured to rotate, as indicated by arrow 228, from within the spacecraft body and into payload holding bay 212 where the latches may engage with (e.g., connect to) the payload. Latches 226 on the three or more landing legs 206 may be configured to rotate or protrude, as indicated by arrows 230 and 232 respectively, from within the three or more landing legs and into payload holding bay 212 where the latches may engage with (e.g., connect to) the payload. In other implementations, the latches may have a different configuration and operate differently from that described above and claimed subject matter is not limited in this respect.

In some embodiments, the three or more landing legs 206 may extend perpendicularly from spacecraft body 202 such that first acute angle 210 is zero. In this case, in order to prevent exhaust plumes 218 from nozzles of the rocket engines from damaging a payload in payload holding bay 212, the rocket engines and/or the nozzles may be angled away from the payload holding bay by angle 222, for example. In other embodiments, the three or more landing legs 206 may extend from spacecraft body 202 such that first acute angle 210 is nonzero. Rocket engines 216 and/or their respective nozzles may be angled away from the payload holding bay by angle 222, which may be equal to angle 210. Angles 210 and 222 may be in a range from zero to about 20 degrees, for example, but these angles may be greater in some implementations, and claimed subject matter is not limited in this respect. In still other embodiments, rocket engines 216 may be located on PPT 200 at large enough distances from each of the landing legs so that damage to the landing legs from thrust is avoided. Accordingly, angle 222 need not be constrained in this respect. In some implementations, each of the landing legs may have a circular cross-section with a diameter that may be constant or increase or decrease along second direction 208, for example.

In some implementations, PPT 200 may include a laser telemeter 234 (e.g., a laser rangefinder) to detect a position of the payload that is in or out of the payload holding bay. For example, the laser telemeter may be located in spacecraft body 202 with its detector portion aimed downward into payload holding bay 212. Accordingly, laser telemeter 234 may measure a distance to the top of a payload that is below PPT 200, partially in payload holding bay 212, or completely in the payload holding bay. Such measured distance, or the detection of the position of a payload, may be at least a partial basis for operating latches 224 and/or 226. For example, if laser telemeter 234 detects that a payload is positioned completely in payload holding bay 212, then the latches may be activated to be engaged with the payload to hold it securely to PPT 200.

In some implementations, PPT 200 may include a control system 236, which will be described below. Control system 236 may operate rocket engines 216, latches 224 and 226, and laser telemeter 234, for example.

In some implementations, PPT 200 may include a fuel port 238 for refueling PPT 200. Fuel port 238 may be configured to allow for refueling while PPT 200 is on the lunar surface, for example.

FIG. 3 is a schematic top view of PPT 200, showing several features below the top with dashed lines. As described above, PPT 200 includes spacecraft body 202 and three or more landing legs 206 extending downward from the spacecraft body. In the example illustrated, PPT 200 includes four landing legs 206. PPT 200 also includes payload holding bay 212 that is partially enclosed at its top by spacecraft body 202 and the four landing legs 206. In the particular embodiment illustrated, rocket engines 302A, 302B, 302C, and 302D may be located, respectively, on a portion of the four landing legs 206. Generally, the rocket engines may be located on any of a number of locations, other than the landing legs, of PPT 200, and claimed subject matter is not limited in this respect. For example, the rocket engines may be attached onto spacecraft body 202, as described below. At least some of the landing legs may include one or more latches 226 at a location that is indicated by arrow 304. The latches are configured to hold a payload 306 securely in payload holding bay 212.

In some embodiments, rocket engines 302 (e.g., 302A, 302B, 302C, and 302D) may be gimballed to allow PPT 200 to have six degrees of freedom for directional control. In other embodiments, the rocket engines may be angularly fixed with respect to PPT 200. For example, the engines need not be gimbal-mounted to be able to change the direction of travel of PPT 200. Accordingly, the rocket engines may be configured to collectively propel PPT 200 in any direction, such as a curved trajectory in gravity, based on which of the rocket engines are selected to produce the thrust. Direction changes may begin by imparting a net rotational force on the PPT. Rotation about any axis, such as axis 308 and axis 310, for example, that is in the general plane (e.g., that includes first direction 204) of spacecraft body 202 may be achieved by operating a particular rocket engine 216 or combination thereof. Subsequent to such a rotation, a different one or more of the rocket engines may be operated to propel the PPT in the desired direction. For example, in a case where PPT 200 is initially traveling upward (e.g., out of the page) in a gravitational field, all of rocket engines 302 (e.g., 302A, 302B, 302C, and 302D) may be operating to produce equal thrust. To change direction from upward to a direction indicated by arrow 312, the rocket engines may be operated so that engine 302B provides a larger thrust than those of engines 302B, 302C, and 302D (which may be turned off), so that PPT 200 will rotate about axis 308. For a relatively gradual transition from the first direction to the desired direction, after some amount of rotation, all of the engines may be operated to stabilize the PPT's direction.

In another example of changing direction, in a case where PPT 200 is initially traveling upward (e.g., out of the page) in a gravitational field, all of rocket engines 302 (e.g., 302A, 302B, 302C, and 302D) may be operating. To change direction from upward to a direction indicated by arrow 314, the rocket engines may be operated so that engines 302A and 302B provide larger thrust than those of engines 302C and 302D (which may be turned off), so that PPT 200 will rotate about axis 310. For a relatively gradual transition from the first direction to the desired direction, after some amount of rotation, all of the engines may be operated to stabilize the PPT's direction.

FIG. 4 is a schematic cross-section view of a PPT 400, according to some embodiments. Various parts of PPT 400 are not necessarily drawn to scale. PPT 400 may be the same as or similar to PPT 102 or PPT 200, for example. PPT 400 includes rocket engines 402 that are separate from three or more legs 404 that extend from a spacecraft body 405. In some implementations, each rocket engine 402 may be connected to at least a portion of legs 404 via an engine support 406 (e.g., a boom), which may (but need not) include gimbal mechanics 408 for adjusting the direction, as indicated by arrow 409, of rocket engine 402 with respect to spacecraft body 405. Rocket engine 402 is configured to produce thrust 410 in a generally downward direction. A bottom portion of each leg 404 may act to protect contents in a payload holding bay 412 from thrust 410.

Each rocket engine 402 may be configured to independently produce thrust 410. In some embodiments, each rocket engine 402 may be angularly fixed in position or attached to engine support 406 via gimbals, as mentioned above. As explained above for FIG. 3, the engines need not be gimbal-mounted to be able to change the direction of travel of PPT 400. Accordingly, rocket engines 402 may be configured to collectively propel PPT 400 in any direction, such as a curved trajectory in gravity, based on which of the rocket engines are selected to produce the thrust. Direction changes may begin by imparting a net rotational force on the PPT. Rotation about any axis that is in the general plane of spacecraft body 405 may be achieved by operating a particular rocket engine 402 or combination thereof. Subsequent to such a rotation, a different one or more of rocket engines 402 may be operated to propel the PPT in the desired direction. For example, in a case where PPT 400 is initially traveling upward in a gravitational field, all of rocket engines 402 may be operating to produce equal thrust.

To change direction from upward to a direction with a horizontal component, rocket engines 402 may be operated so that one engine (or two engines) provides a larger thrust than those of the other engines. In some implementations, gimbals may be used instead of or in addition to the engine operation described above.

FIG. 5 is a schematic cross-section view of a PPT 500, according to still other embodiments. Various parts of PPT 500 are not necessarily drawn to scale. PPT 500 may be the same as or similar to PPT 102, for example. PPT 500 includes rocket engines 502 that are separate from three or more legs 504 that extend from a spacecraft body 505. In some implementations, each rocket engine 502 may be connected to at least a portion of spacecraft body 505 via an engine support 506 (e.g., a boom), which may (but need not) include gimbal mechanics 508 for adjusting the direction of rocket engine 502 with respect to spacecraft body 505, as indicated by arrow 509. Rocket engine 502 is configured to produce thrust 510 in a generally downward direction. A bottom portion of each leg 504 may act to protect contents in a payload holding bay 512 from thrust 510.

Each rocket engine 502 may be configured to independently produce thrust 510. In some embodiments, each rocket engine 502 may be angularly fixed in position or attached to engine support 506 via gimbals, as mentioned above. As explained above for FIG. 3, the engines need not be gimbal-mounted to be able to change the direction of travel of PPT 500. Accordingly, rocket engines 502 may be configured to collectively propel PPT 500 in any direction, such as a curved trajectory in gravity, based on which of the rocket engines are selected to produce the thrust. Direction changes may begin by imparting a net rotational force on the PPT. Rotation about any axis that is in the general plane of spacecraft body 505 may be achieved by operating a particular rocket engine 502 or combination thereof. Subsequent to such a rotation, a different one or more of rocket engines 502 may be operated to propel the PPT in the desired direction. For example, in a case where PPT 500 is initially traveling upward in a gravitational field, all of rocket engines 502 may be operating to produce equal thrust. To change direction from upward to a direction with a horizontal component, rocket engines 502 may be operated so that one engine (or two engines) provides a larger thrust than those of the other engines. In some implementations, gimbals may be used instead of or in addition to the engine operation described above.

FIG. 6 is a block diagram of a control system 600 of a PPT, according to some embodiments. For example, control system 600 may be the same as or similar to control system 236 of PPT 200. Control system 600 may include a processor 602, a navigation block 604, an engine operations block 606, a communications block 608, and a payload operations block 610.

Processor 602 may include any type of computing device having one or more processing units operably connected to computer-readable media 612. The computer-readable media may include two types of computer-readable media, namely computer storage media and communication media. Computer storage media may include volatile and non-volatile machine-readable, removable, and non-removable media implemented in any method or technology for storage of information (in compressed or uncompressed form), such as computer (or other electronic device) readable instructions, data structures, program modules, or other data to perform processes or methods described herein. Communication media may embody computer-readable instructions, data structures, program modules, or other data in a modulated data signal, such as a carrier wave, or other transmission mechanism.

In some examples, computer-readable media 612 may store instructions executable by processor 602. Computer-readable media 612 may also store instructions executable by an external CPU-based processor, executable by a GPU, and/or executable by an accelerator, such as an FPGA-based accelerator, a DSP-based accelerator, or any internal or external accelerator, just to name a few examples. Executable instructions stored on computer-readable media 612 may include, for example, an operating system and other modules, programs, or applications that may be loadable and executable by processor 602.

Navigation block 604 may be configured to interface between processor 602 and any number of navigation devices, such as an accelerometer, a gyrocompass, a magnetometer, position and orientation sensors, as well as access to map data, telemetry data, and so on. Other navigation devices may include sonar for operations in an atmosphere or for distance and/or position measurements of a payload (e.g., 306) with respect to the PPT. For example, laser telemeter 234 may detect a position of a payload that is in or out of a payload holding bay of the PPT.

Engine operations block 606 may be configured to interface between processor 602 and rocket engines 216, for example. Processor 602 may provide commands to engine operations block 606 to control (via actuators, valves, etc.) amounts of thrust generated by each of engines 216. In a particular example, processor 602, based at least in part on measured data and map data provided by navigation block 604, may send commands to engine operations block 606 to control the amount of thrust generated by each of engines302A, 302B, 302C, and 302D to perform the change in directions described for FIG. 3.

Communications block 608 may be configured to receive remote (wireless) instructions to be performed by the PPT. Communications block 608 may include a receiver and transmitter and an interface to processor 602. Accordingly, processor 602 may receive executable code from an outside source or transmit executable code to an outside entity (e.g., report progress of payload delivery, etc.). In some implementations, the PPT may operate autonomously but may receive wireless instructions, via the receiver of communications block 608, for modifying a payload delivery activity or may receive updated navigation data measured and/or collected by remote entities (e.g., a ground station that measures local environmental data).

Payload operations block 610 may be configured to interface between processor 602 and various mechanical devices, such as latches 226 and 228, to selectively engage with a payload, such as attaching to the payload for payload pickup and de-attaching for payload drop off. Payload operations block 610 may receive information from navigation block 604.

Figure 7:
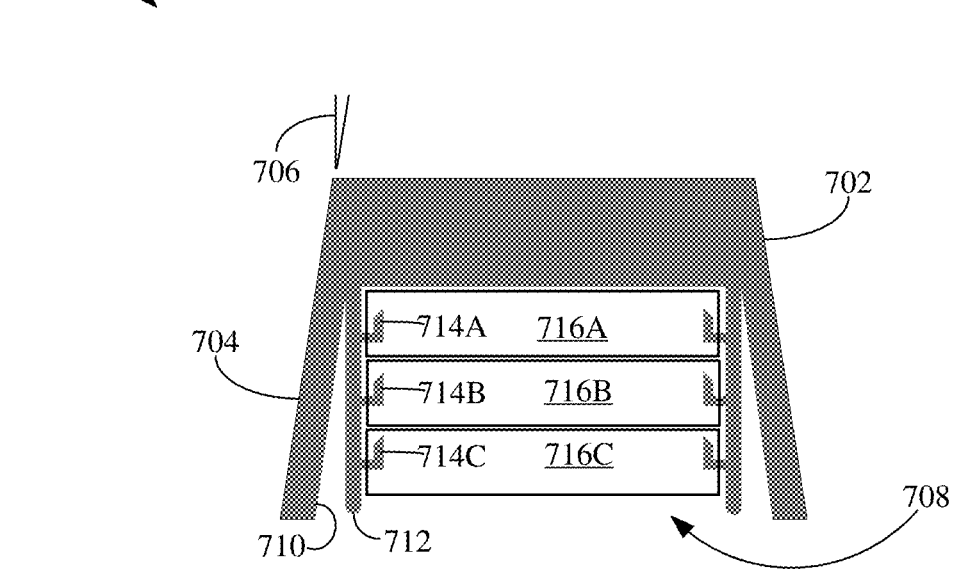
FIG. 7 is a schematic cross-section view of a propulsion-based payload transporter, according to other embodiments.

FIG. 7 is a schematic cross-section view of a PPT 700, according to some embodiments. PPT 700 may be similar to PPT 200 except that a configuration of latches for PPT 700 may be different from that of PPT 200. Similar to PPT 200, PPT 700 includes a spacecraft body 702 and landing legs 704. If the landing legs protrude from the spacecraft body at an angle 706, then sides of a payload holding bay 708, if defined by inside surfaces 710 of landing legs 704, would also be at an angle. Payload holding bay 708 would have angular sides. In some embodiments, such a configuration is not desirable for at least the reason that payloads (e.g., transport containers) may have vertical sides. Thus, PPT 700 may include latch rails 712 that include one or more latches 714 (e.g., 714A, 714B, and 714C). This is in contrast to PPT 200 wherein latches 226 are on sides of landing legs 206 that face the payload holding bay. Latch rails 712 may protrude perpendicularly downward from spacecraft body 702 and extend to at least the lowest latch (e.g., 714C). In some implementations, one or more latches 714 may be used to engage with a single payload (e.g., 306). In other implementations, multiple latches 714 may be respectively used to engage with portions of a payload (e.g., 306). For example, a payload may comprise two or more separable payload portions (e.g., 128). Each payload portion may be delivered to a respective destination. Accordingly, latch rails 712 may include sets of latches configured to separately release each of the payload portions at the different destinations. For example, a payload portion at the bottom of the stack may be dropped off first at a first destination. The remaining payload portions may be sequentially dropped off from the bottom to the topmost payload portion. In some implementations, the latches may be configured to drop off two or more payload portions at a single destination.

For example, a payload may comprise separable stacked payload portions 716A, 716B, and 716C. Accordingly, latches 714A may be configured to engage with payload portion 716A, latches 714B may be configured to engage with payload portion 716B, and latches 714C may be configured to engage with payload portion 716C.

Figure 8:
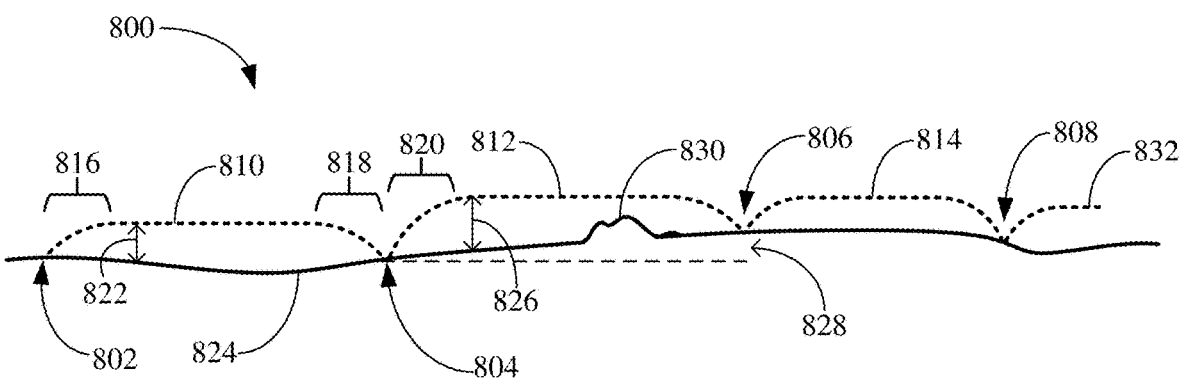
FIG. 8 is a schematic representation of a payload delivery operation performed by a propulsion-based payload transporter, according to some embodiments.

FIG. 8 is a schematic representation of an example payload delivery operation 800 by a PPT, according to some embodiments. For example, the PPT may be the same as or similar to 102, 200, or 700. Claimed subject matter, however, is not limited to any particular PPT described herein. For sake of example, operation 800 will be considered to occur on the Moon, though claimed subject matter is not so limited.

Operation 800 may involve picking up a payload at a location 802, dropping off a portion of the payload at a location 804, dropping off another portion of the payload at a location 806, and picking up another payload at a location 808. Between each of locations 802, 804, 806, and 808 is a trajectory 810, 812, and 814, respectively, travelled by the PPT. Comparing operation 800 to process 100 of FIG. 1, a portion 816 of trajectory 810 may be the same as or similar to that in phases I and II, a portion 818 of trajectory 810 may be the same as or similar to that in phases III and IV, and a portion 820 of trajectory 812 may be the same as or similar to that in phase V, and so on for the remaining trajectories of operation 800.

In trajectory portion 816 (e.g., phases I and II of process 100), the PPT may initiate a rotation, such as by selectively operating the one or more rocket engines (e.g., 216), to change its predominantly vertical direction (e.g., to gain elevation from the payload pickup location 802) to a predominantly horizontal direction (e.g., to travel toward the payload drop off location 804) at an elevation 822 that is based on information regarding the lunar surface 824 below trajectory 810. For example, such information may be map data stored in control system 600 and/or data collected by navigation block 604. In a particular example, trajectory 810 and elevation 822 may be predetermined based on a priori knowledge of elevations and contours of the lunar surface, including the elevation gain or loss between pickup location 802 and drop off location 804. As another example, an elevation 826 at which a change in direction of PPT may be performed may be based at least part on an elevation gain 828 from drop off location 804 to drop off location 806.

Elevation 826 may also be based on intermediate elevations 830 (e.g., boulders, crater rims, hills, mountains) along (and below) trajectory 812.

In the present example, the PPT may not be carrying a payload in trajectory 814, having dropped off a payload at location 806. Another payload, however, may be waiting to be picked up at location 808. In some implementations, the PPT may be refueled at location 808, for example, or refueled at another landing location, depending on its fuel needs and planned operations (e.g., trajectories). A trajectory 832 may end at a drop off location or, possibly, at another pickup location wherein another payload will be picked up. In this case, more than one separable payload portion (e.g., 716A, 716B, and 716C) may be present in the payload holding bay (e.g., 708) during trajectory 832.

Figure 9:
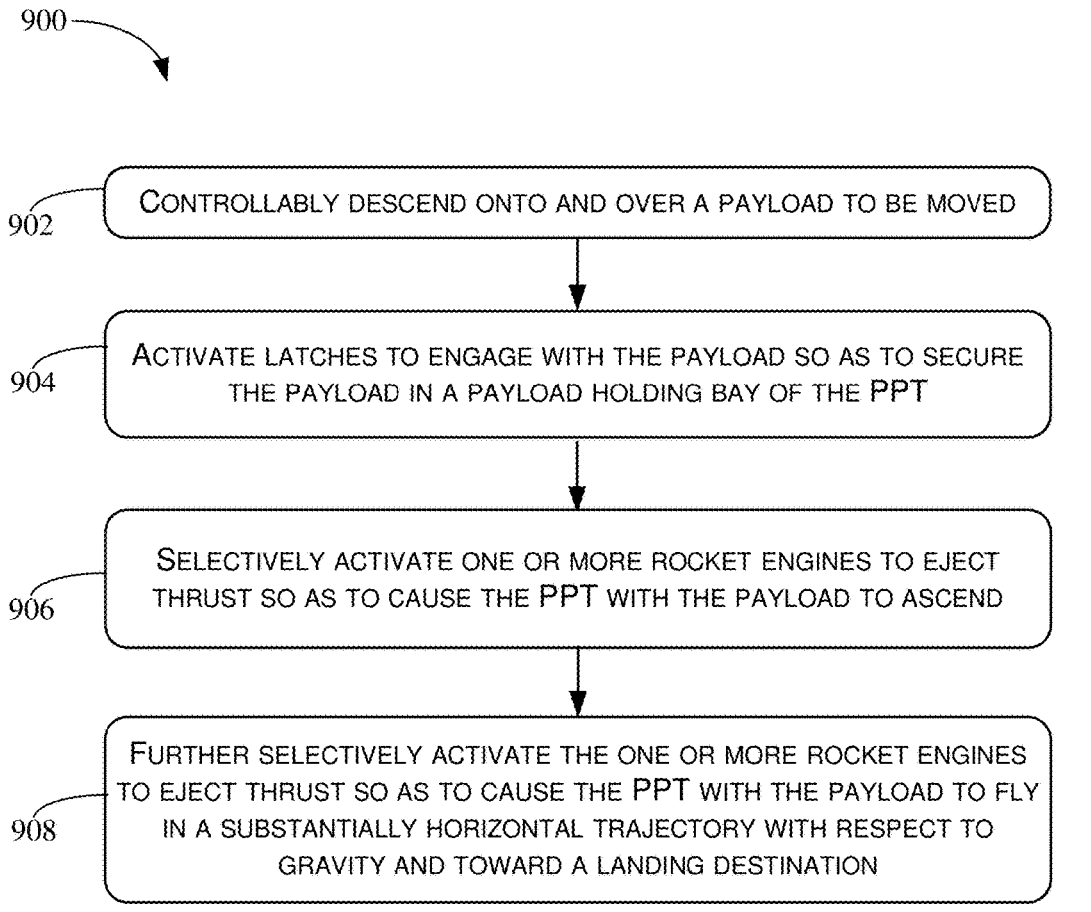
FIG. 9 is a flow diagram of a payload delivery operation performed by a propulsion-based payload transporter, according to some embodiments.

FIG. 9 is a flow diagram of a payload delivery operation 900 performed by a PPT, according to some embodiments. For example, process 900 may be performed by an operator such as a remotely-located human operator, an electronic controller, a computer processing system (e.g., 602) following computer-executable instructions, or a combination thereof. The PPT may be the same as or similar to 102, 200, or 700, for example. At 902, the operator may controllably descend onto and over a payload to be moved, such as in phase I of process 100. At 904, the operator may activate latches to engage with the payload so as to secure the payload in a payload holding bay of the PPT. At 906, the operator may selectively activate one or more rocket engines to produce thrust so as to cause the PPT with the payload to ascend. As described above, the one or more rocket engines may be located at the sides of the payload holding bay, and the direction of the produced thrust from the one or more rocket engines may be at a substantial angle away from the payload. At 908, the operator may further selectively activate the one or more rocket engines to produce thrust so as to cause the PPT with the payload to fly in a substantially horizontal trajectory with respect to gravity and toward a landing destination.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents.

We claim as follows:

1. A propulsion-based payload transporter comprising:
a spacecraft body;
three or more landing legs extending from a surface of the spacecraft body in a perpendicular direction or offset from the perpendicular direction by a first acute angle;
a payload holding bay partially enclosed by the spacecraft body and the three or more landing legs, wherein the payload holding bay has a central axis that is perpendicular to the surface of the spacecraft body;

rocket engines configured to independently produce a respective thrust and exhaust plume in a direction that is angled away from the payload holding bay by a second acute angle with respect to the central axis, wherein lower portions of the three or more landing legs are interposed between the rocket engines and the payload holding bay to protect a payload in the payload holding bay from the exhaust plumes; and latches on the spacecraft body or on the three or more landing legs, wherein the latches are configured to engage or disengage with a payload that is in the payload holding bay.

2. The propulsion-based payload transporter of claim 1, wherein the latches are on the three or more landing legs, and are on sides of the three or more landing legs that face the payload holding bay.

3. The propulsion-based payload transporter of claim 1, wherein the latches are on the spacecraft body and are on a side of the spacecraft body that faces the payload holding bay.

4. The propulsion-based payload transporter of claim 1, wherein the first and the second acute angles range from zero to 20 degrees.

5. The propulsion-based payload transporter of claim 1, wherein the latches are on the spacecraft body and are configured to rotate from within the spacecraft body and into the payload holding bay where the latches are further configured to engage with the payload.

6. The propulsion-based payload transporter of claim 1, wherein the latches are on the three or more landing legs and are configured to rotate or protrude from within the three or more landing legs and into the payload holding bay where the latches are further configured to engage with the payload.

7. The propulsion-based payload transporter of claim 1, further comprising multiple sets of latches to engage or disengage with the payload, wherein the payload comprises multiple separable portions to be delivered to respective locations, and wherein the multiple sets of latches are configured to respectively engage or disengage with each of the multiple separable portions.

8. The propulsion-based payload transporter of claim 1, wherein each of the rocket engines are angularly fixed with respect to the landing legs.

9. The propulsion-based payload transporter of claim 8, wherein all of the rocket engines are configured to collectively propel the propulsion-based payload transporter in a curved trajectory in gravity based on which of the rocket engines are selected to produce the respective thrust and exhaust plume.

10. The propulsion-based payload transporter of claim 1, further comprising a laser telemeter to detect, relative to the payload holding bay, a position of the payload that is in or out of the payload holding bay.

11. A method of operating a propulsion-based payload transporter (PPT) having landing legs, the method comprising:

controllably descending onto and over a payload to be moved;

operating latches to engage with the payload so as to secure the payload in a payload holding bay of the PPT;

selectively operating one or more rocket engines to produce thrust and an exhaust plume so as to ascend with the payload, wherein the one or more rocket engines are located at the sides of the payload holding bay, wherein the direction of the exhaust plume from each of the one or more rocket engines is at an acute angle away from the payload, and wherein landing legs of the PPT are positioned to shield the payload in the payload holding bay from the exhaust plumes during the ascending; and further selectively operating the one or more rocket engines to produce thrust so as to fly with the payload in a substantially horizontal trajectory with respect to gravity and toward a landing destination while maintaining shielding of the payload holding bay from the exhaust plumes.

12. The method of claim 11, further comprising:

further selectively operating the one or more rocket engines to produce thrust so as to descend from the substantially horizontal trajectory toward the landing destination.

13. The method of claim 12, further comprising:

controllably descending onto the landing destination;

operating the latches to disengage with the payload so as to release the payload from the payload holding bay; and selectively operating the one or more rocket engines to produce thrust so as to ascend without the payload.

14. The method of claim 12, wherein the payload comprises multiple separable portions, and wherein the method further comprises:

controllably descending onto the landing destination;

operating the latches to disengage with one of the multiple separable portions of the payload so as to i) release the one of the multiple separable portions from the payload holding bay and ii) retain other ones of the multiple separable portions; and selectively operating the one or more rocket engines to produce thrust so as to fly in a substantially horizontal trajectory with respect to gravity and toward a second landing destination to deliver the other ones of the multiple separable portions.

15. The method of claim 14, wherein the multiple separable portions are maintained in the payload holding bay in a stacked configuration.

16. The method of claim 12, further comprising:

controllably descending onto the landing destination, wherein the landing destination includes an additional payload;

operating additional latches to engage with the additional payload so as to secure the additional payload in the payload holding bay; and selectively operating the one or more rocket engines to produce thrust so as to fly in a substantially horizontal trajectory with respect to gravity and toward a third landing destination.

17. The method of claim 11, further comprising:

retrieving from memory map information that indicates a relative elevation of the landing destination;

based at least in part on the relative elevation of the landing destination, determining when to selectively activate the one or more rocket engines to produce thrust so as to fly in the substantially horizontal trajectory and toward the landing destination.

18. The method of claim 11, further comprising using sonar to measure positions of the payload.

19. The method of claim 11, wherein the payload is a transport container configured to hold contents, and wherein the transport container includes hardware that corresponds to the latches and enables the latches to engage with the transport container.

20. The method of claim 11, wherein further selectively operating the one or more rocket engines to produce thrust so as to fly in the substantially horizontal trajectory comprises operating the one or more rocket engines to produce thrust so as to rotate the PPT about a substantially horizontal axis of the PPT.

* * * * *